（12）United States Patent
Johnson

(10) Patent No.: US 7,191,240 B1
(45) Date of Patent: Mar. 13, 2007

(54) GENERIC NETWORK PROTOCOL LAYER WITH SUPPORTING DATA STRUCTURE

(75) Inventor: Michael Joseph Johnson, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/503,676

(22) Filed: Feb. 14, 2000

(51) Int. Cl.
G06F 15/16 (2006.01)

(52) U.S. Cl. ............... 709/230; 709/203; 709/216; 709/232; 709/234; 709/245

(58) Field of Classification Search ........... 709/200, 709/216, 230, 232, 245, 234
See application file for complete search history.

(56) References Cited

U.S. PATENT DOCUMENTS

| | | | |
|---|---|---|---|
| 5,487,064 A | | 1/1996 | Galand et al. ............ 370/60 |
| 5,687,373 A | | 11/1997 | Holmes et al. ............ 395/682 |
| 5,706,437 A | | 1/1998 | Kirchner et al. ............ 395/200 |
| 5,710,908 A | * | 1/1998 | Man |
| 5,729,681 A | * | 3/1998 | Aditya et al. |
| 5,828,835 A | * | 10/1998 | Isfeld et al. |
| 5,987,517 A | * | 11/1999 | Firth et al. |
| 6,034,963 A | * | 3/2000 | Minami et al. |
| 6,064,805 A | * | 5/2000 | McCrory et al. ............ 709/227 |
| 6,122,670 A | * | 9/2000 | Bennett et al. |
| 6,226,680 B1 | * | 5/2001 | Boucher et al. |
| 6,233,619 B1 | * | 5/2001 | Narisi et al. |
| 6,247,060 B1 | * | 6/2001 | Boucher et al. ............ 709/238 |
| 6,324,583 B1 | * | 11/2001 | Stevens |
| 6,389,479 B1 | * | 5/2002 | Boucher et al. ............ 709/243 |
| 6,651,117 B1 | * | 11/2003 | Wilson et al. ............ 710/33 |

OTHER PUBLICATIONS

U.S. Appl. No. 60/163,266.*
"Reusable Object Oriented Framework for Plug Compatible Application", IBM Technical Disclosure Bulletin, vol. 38, No. 3, Mar. 1995.
"Implementing a Named-Pipe Network Module in AIX", IBM Technical Disclosure Bulletin, vol. 36, No. 7, Jul. 1993.

* cited by examiner

Primary Examiner—Saleh Najjar
Assistant Examiner—Michael Y. Won
(74) Attorney, Agent, or Firm—Sawyer Law Group LLP

(57) ABSTRACT

A generic protocol layer class (GPLC) having send and receive procedures and a common data buffer in which the sent or received data is placed and acted upon by each protocol layer implemented with the GPLC. Instead of copying the data packet passed to it by a higher or lower protocol layer implemented with the GPLC, a protocol layer implemented with the GPLC acts upon the common data buffer by moving a start pointer and an end pointer along the data contained in the common data buffer prior to its invoking of the next higher or lower protocol layer implemented.

46 Claims, 11 Drawing Sheets

GENERIC NETWORK PROTOCOL LAYER WITH SUPPORTING DATA STRUCTURE

TECHNICAL FIELD

The present invention is generally related to computer network communications protocols. More particularly, the present invention relates to a method, program product and data structure for the implementation of a generic network protocol class usable by multiple network protocols running on a single computer system.

BACKGROUND OF THE INVENTION

Networks provide computers with the basic ability to transfer data from one computer to another computer. However, in order to be able to communicate with each other, the computers attached to the network require sets of rules for communication called "protocols." These protocols specify how the computers on the network interact and exchange messages. In most cases, the protocols provide rules for, among other things, the formatting of messages and the handling of errors.

In order to simplify the design and implementation of protocols and provide a computer with the ability to communicate over one or more networks to one or more different computers, programmers have typically used a set of separate, independent protocols where each protocol has different responsibilities. This set of protocols is called a "protocol suite" and covers all forms of a computer's network communications as needed.

A layering model is the most common way to divide a protocol suite into sub-parts and describe each part individually. The most well know layering model for network communications is the seven layer Open Systems Interconnect model introduced by the International Organization for Standardization more than twenty years ago (the "OSI Model"). The basis of this model is illustrated in Table 1.

TABLE 1

| Layer | Responsibilities |
|---|---|
| 1. Physical | Specifies the electrical and mechanical connections to the network |
| 2. Data Link | The data link layer splits data into frames for sending on the physical layer and receives acknowledgement frames. It performs error checking and re-transmits frames not received correctly. It provides an error-free virtual channel to the network layer. The data link layer is split into an upper sub-layer, Logical Link Controls (LLC), and a lower sub-layer, Media Access Control (MAC). |
| 3. Network | The network layer determines routing of packets of data from sender to receiver via the data link layer and is used by the transport layer. The most common network layer protocol is Internet Protocol (IP). |
| 4. Transport | The transport layer determines how to use the network layer to provide a virtual error-free, point to point connection so that host A can send messages to host B and they will arrive un-corrupted and in the correct order. It establishes and dissolves connections between hosts. An example transport layer protocol is Transmission Control Protocol (TCP). |
| 5. Session | The session layer uses the transport layer to establish a connection between processes on different hosts. It handles security and creation of the session. |
| 6. Presentation | Performs functions such as text compression, code or format conversion to try to smooth out differences between hosts. Allows incompatible processes in the application layer to communicate via the session layer. |

TABLE 1-continued

| Layer | Responsibilities |
|---|---|
| 7. Application | This layer handles issues like network transparency, resource allocation and problem partitioning. The application layer is concerned with the user's view of the network (e.g. formatting electronic mail messages). The presentation layer provides the application layer with a familiar local representation of data independent of the format used on the network. |

In the foregoing table, the application layer is typically referred to as the "highest" protocol layer and the physical layer is typically referred to as the "lowest" protocol layer.

Under the OSI Model, the sending of data usually is initiated by the application layer which (a) specifies the original data to be sent, (b) creates a data packet by adding to the original data any header or checksum data required by the application layer and then (c) passes the resulting data packet to the presentation layer. The presentation layer then (i) processes the data packet and creates one or more new data packets from the data packet passed to it by the application layer, (ii) adds to each of the new data packets any header or checksum data required by the presentation layer and then (iii) passes the new data packets to the session layer. Processing the data packet may include dividing the packet into smaller pieces in accordance with the processing or memory limits of the current layer. This cycle of (i) processing a passed data packet and creating one or more new data packets from the passed data packet, (ii) adding to each of the new data packets any header or checksum data required by the acting protocol layer and then (iii) passing the new data packets to the next lower protocol layer is then repeated by the session layer and each protocol layer below the session layer until the data packet reaches the physical layer. Once a data packet reaches the physical layer, it is placed onto the physical network for delivery to the receiving computer.

Upon receipt of a data packet from the physical network by the receiving computer's physical layer, the data packet is passed to the data link layer which then (a) processes the data packet and strip off any headers and checksum data added to the data packet by the sending computer's data link layer, (b) combines (as applicable) into a new data packet the processed and stripped data packet and zero or more previously processed and stripped data packets and then (c) passes the resulting data packet to the network layer. This cycle of (i) processing the passed data packet and stripping off any headers and checksum data added to the data packet by the same protocol layer of the sending computer and (ii) combining (as applicable) into a new data packet the processed and stripped data packet with zero or more previously processed and stripped data packets and then (ii) passing the resulting data packet to the next higher protocol layer continues until the data packet reaches the application layer. The application layer then strips off any headers and checksum data added to the original data by the sending computer's application layer and processes the data as necessary.

As shown by the foregoing, (i) during the sending of data, each protocol layer copies the data packet passed to it by a higher protocol level along with any header and checksum data added by the previous protocol layer and (ii) during the receipt of data, each protocol layer copies the received data less any headers and checksums added to the data by such protocol layer on the sending side. In addition, on most computer systems used today, each protocol layer is developed independently by a separate group of programmers with no sharing of code between protocol layers. Therefore, because of this copying of data and no sharing of code between protocol layers, there are significant inefficiencies in processing and memory usage during the sending and receipt of data by computers over a network. The reduction of these inefficiencies and use of memory becomes more important as multiple protocol layers are included in "embedded" applications (e.g. home appliances, monitoring equipment, etc.) which will, because of various cost pressures, be implemented using less costly microprocessors having significantly less processing power and memory than stand alone computer systems.

SUMMARY OF THE INVENTION

It is a principal object of the invention to provide a method that allows the sharing of code between separate protocol layers. It is another object of this invention to provide a method and structure that eliminates the need for the copying of data between protocol layers.

According to the invention, the foregoing objects are accomplished by the creation of a generic protocol layer class (GPLC) having the two key methods (in addition to such other methods as are necessary) "send" and "receive" and a common data buffer in which the sent or received data is placed and acted upon by each protocol layer implemented with the GPLC. Instead of copying the data packet passed to it by a higher or lower protocol layer implemented with the GPLC, a protocol layer implemented with the GPLC acts upon the common data buffer by moving a "start" pointer and an "end" pointer along the data contained in the common data buffer prior to invoking the next higher or lower protocol layer implemented with the GPLC.

BRIEF DESCRIPTION OF THE DRAWINGS

The invention is better understood by reading the following detailed description of the preferred embodiment in conjunction with the accompanying drawings, wherein.

DETAILED DESCRIPTION OF THE PREFERRED EMBODIMENT

Figure 1:
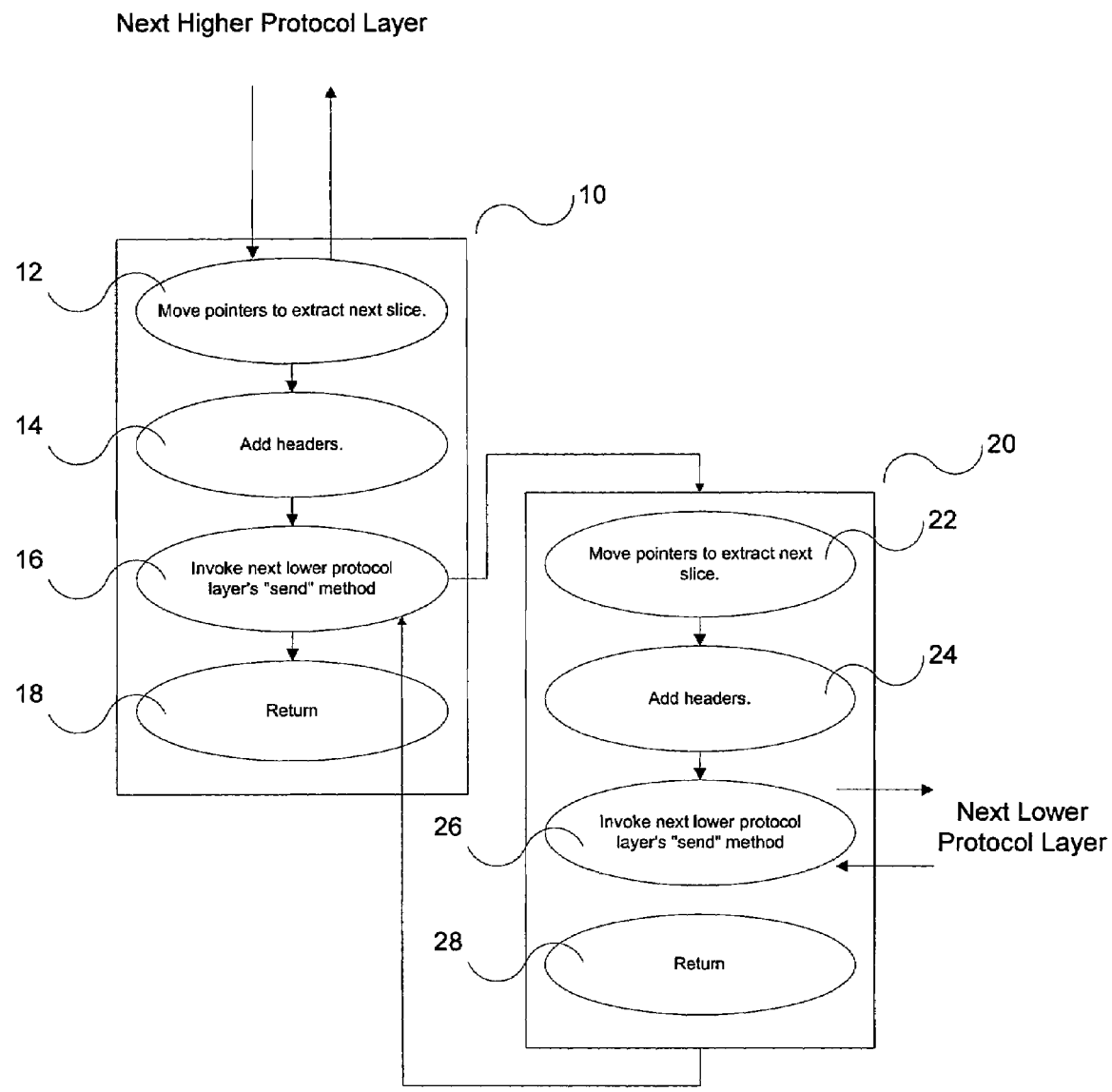
FIG. 1 depicts the logical flow of the "send" method of the GPLC.

In the preferred embodiment of the invention, a basic implementation of the GPLC for two protocol layers is considered. However, the use of only two protocol layers in the description of the preferred embodiment of the GPLC as shown in FIGS. 3 through 11 should in no way be considered a limitation on the number of protocol layers able to be implemented with the GPLC. In addition, for the purposes of understanding the preferred embodiment of the GPLC, it should be noted that the GPLC is not limited only to the implementation of one or more different protocol layers, but may also be used to implement multiple sub-layers within each protocol layer (i.e. multiple applications within the application layer that have a communications hierarchy). In fact, in some instances, it may be practical only to implement such sub-layers with the GPLC as the other protocol layers may be readily and economically available from third-party sources. Therefore, for the purposes of the description of the preferred embodiment, each reference to "protocol layer" should be read as "protocol layer or sub-layer" unless expressly specified otherwise.

The present invention is applicable to computer systems that communicate with other computer systems over a computer communications network. As such, there are no restrictions on the type of network involved or on the specific communications protocols employed. For example, the invention is equally applicable to both conventional "wired" computer networks and "wireless" computer networks. It can be utilized in networks including Transport Control Protocol/Internet Protocol (TCP/IP) networks, the Asynchronous Transport Mode (ATM) networks, Frame Relay networks, Integrated Services Digital Networks (ISDN) networks, the Global System for Mobile Communication (GSM) network, Ethernet local area networks (LANs), token ring LANs, and any other network having a layered network architecture. The network connection can include an Ethernet or token ring LAN adapter, a Personal Computer Memory Card International Association (PCM-CIA) card or a wireless (cellular) modem card.

For the preferred embodiment, an object class is used that includes:

(1) a "send" method;
(2) a "receive" method;
(3) a common data buffer used by all members of the object class;

(4) and such other methods and data structures as are common to and required by each of the network protocol layers to be implemented with the GPLC.

Under this object class, the "send" and "receive" methods act upon the common data buffer defined for the class as explained in more detail below. In order to communicate with another protocol level implemented with the object class, the "send" and "receive" methods respectively invoke the "send" and "receive" methods of the next lower protocol layer implemented with the object class, passing only pointers to the "start" and "end" of the data stored in the common data buffer.

As described herein, the "send" and "receive" methods of the preferred embodiment of the GPLC differ significantly from the prior art. Under the prior art, each protocol layer is programmed independently from the other protocol layers with which it communicates. When communicating with another protocol layer, the "send" and "receive" methods and procedures of the sending or receiving protocol layer pass to the next protocol layer a copy of the data being sent or received. The next protocol layer then takes this copy of the data, processes it, adds its own headers and checksum information to the data and passes a copy of the entire bundle to the next protocol layer as applicable. Under the prior art, the whole data gets copied multiple times as it is handled by the various protocol layers. This multiple copying of the data results in an inefficient use of memory and processing resources. With the GPLC, the copying of data only occurs at the interface boundaries between protocol layers implemented with the GPLC and those that are not, thereby reducing the amount of memory and processing time required for the sending and receipt of data. This reduction in resource use is especially useful in embedded applications (i.e. home appliances, monitoring equipment, etc.) where, in order to minimize costs, memory and processing resources are intentionally limited.

Referring now in more detail to the drawings in which like numerals refer to like parts throughout several views, FIG. 1 shows the general logic flow for the sending of data using the "send" method of the GPLC. The logic flow demonstrated by FIG. 1 begins with the invoking of "send" method 10 by a higher level of protocol layer's send method or procedure and passing to "send" method 10 of any required data or other information. The first step 12 adjusts the "start" and "end" pointers of the common data buffer accordingly in order to extract an appropriately sized slice for sending. (For the purposes of FIG. 1 and other figures and descriptions related to the preferred embodiment, the term "slice" is used to refer in a generic manner to a portion of data, which may be, for example and without limitation, a packet, a block or a physical record depending on the application.) This slice, depending on the size of the data being sent as compared to the maximum block size of data able to handled by the protocol layer implemented by "send" method 10, may be all or only a portion of the data passed to "send" method 10 by the next higher protocol layer. Step 14 then adds to the data the headers and checksums of the protocol layer implemented by "send" method 10. Step 16 invokes the next lower protocol layer's "send" method 20, passing to such method any required data or other information.

The first step 22 of "send" method 20 adjusts the "start" and "end" pointers of the common data buffer accordingly in order to extract an appropriately sized slice for sending. This slice, depending on the size of the data, headers and checksums passed by "send" method 10 as compared to the maximum block size of data able to handled by the protocol layer implemented by "send" method 20, may be all or only a portion of the data, headers and checksums passed by "send" method 10. Step 24 then adds to the data the headers and checksums of the protocol layer implemented by "send" method 20. Step 26 invokes the next lower protocol layer's "send" method or procedure, passing to such method or procedure any required data or other information. Upon the exiting of the next lower protocol layer's "send" method or procedure and return of control to "send" method 20, step 28 then exits, thereby returning control to "send" method 10 and passing to "send" method 10 any required data or other information. Step 18 then exits, thereby returning control to the higher level protocol layer that invoked it and passing to such higher level protocol layer any required data or other information.

Figure 2:
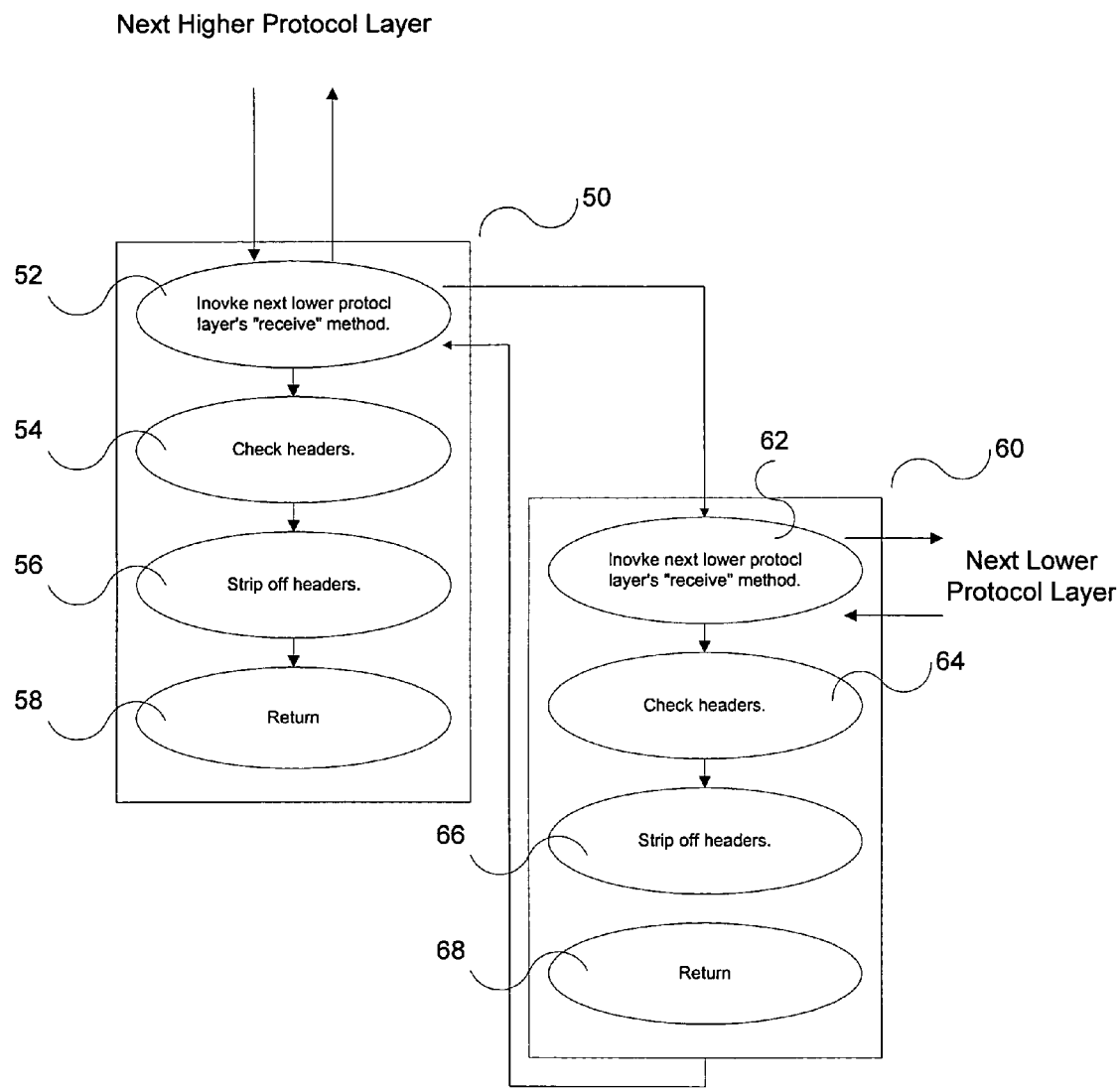
FIG. 2 depicts the logical flow of the "receive" method of the GPLC.

FIG. 2 shows the general logic flow for the receipt of data using the "receive" method of the GPLC. The logic flow begins with the invoking of "receive" method 50 by a higher level method or procedure that is ready to receive data (i.e. this higher level thread or process is ready to wait for the receipt of data by, among other things, suspending execution until data arrives). The first step 52 of "receive" method 50 invokes the next lower protocol layer's "receive" method 60, passing to such method any required information (e.g. the location of the receiving buffer for the data). The first step 62 of "receive" method 60 then invokes the next lower protocol layer's "receive" method or procedure, passing to such method or procedure any required information.

Upon return from the "receive" method or procedure of the next lower level protocol layer, step 64 processes the headers and checksums added by the "send" method of the same level protocol layer that originally sent the data. Step 66 strips of any such headers and checksums from the data. Step 68 exits, thereby returning control to the higher level protocol layer method 50 and passing to such method any required data or other information.

Upon return from "receive" method 60, step 54 processes the headers and checksums added by the "send" method of the same level protocol layer that originally sent the data. Step 56 strips of any such headers and checksums from the data. Step 58 then exits, thereby returning control to the higher level protocol layer method or procedure that invoked it and passing to such method any required data or other information.

It should be noted that, based upon the particular environment and operation of a particular implementation of the GPLC, the data being sent may, at one or more protocol layer levels, be broken into smaller packets during the sending process, with reassembly of these packets taking place during the receiving process. This breaking up and reassembly may be necessitated by, among other things, the differences in block sizes between specific implementations of the various protocol layers, hardware limitations, and/or network limitations. In addition, there is no requirement that the data be reassembled on the receiving side at the same protocol layer as it was broken up on the sending side.

FIGS. 3 through 7 depict the state of the common data buffer during various stages of the sending of data where only two protocol layers are implemented using the GPLC. FIGS. 8 through 11 depict the state of the common data buffer during various stages of the receipt of data where only two protocol layers are implemented using the GPLC. For the purposes of FIGS. 3 through 11, what is referred to as the "first" protocol layer is the highest level protocol layer implemented with the GPLC, with the "second" protocol layer being the lowest level protocol layer implemented with the GPLC.

Figure 3:
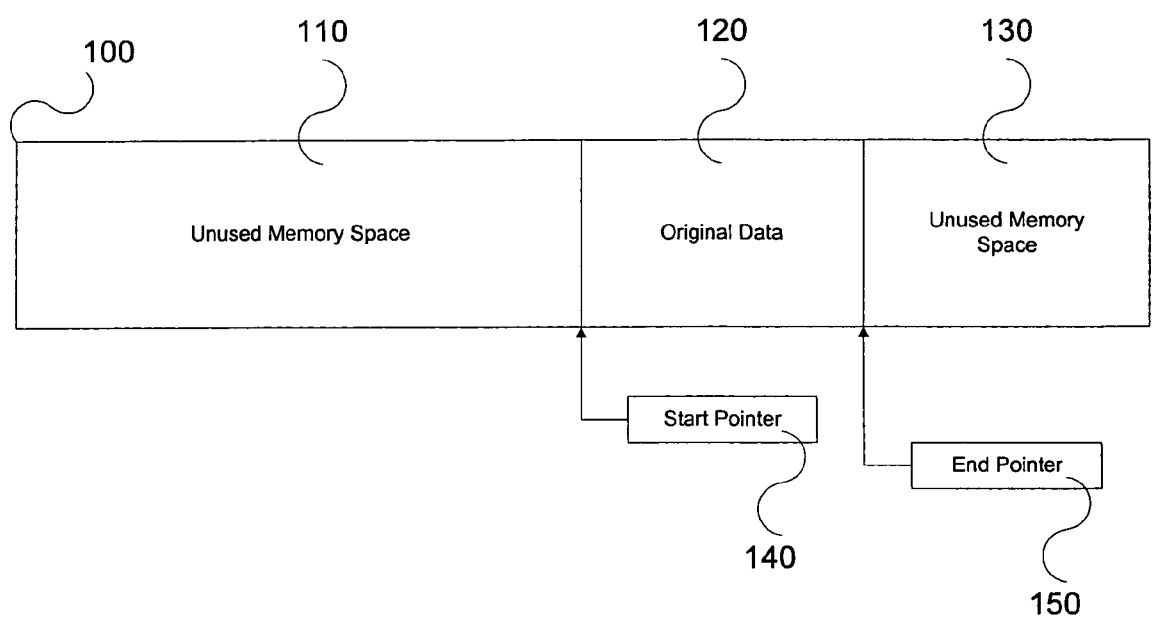
FIG. 3 depicts the contents of the common data buffer during the sending of data following the placement of the data being sent into the common data buffer by the first GPLC based protocol layer.

FIG. 3 depicts the state of the common data buffer 100 during the sending of data following the placement of the original data 120 to be transferred into the common data buffer 100 by the "send" method of the first protocol layer. Typically, the common data buffer 100 has unused memory space 110 and 130 on each side of the original data 120, but this is not required. The start pointer 140 is set to the location of the first byte of the original data 120 and the end pointer 150 is set to the location of the last byte of the original data 120.

Figure 4:
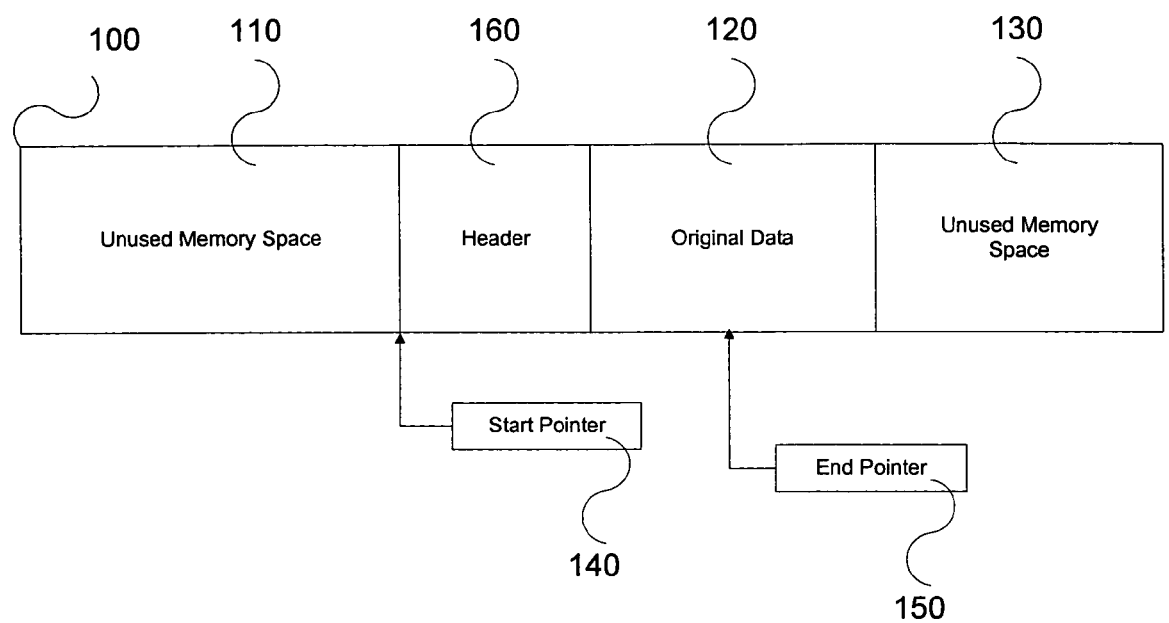
FIG. 4 depicts the contents of the common data buffer during the sending of data following the extraction of the first slice and the addition of header and checksum information by the first GPLC based protocol layer.

FIG. 4 depicts the state of the common data buffer 100 during the sending of data following the extraction of the first slice by the "send" method of the first protocol layer and the addition by such "send" method of the protocol layer's headers and checksums 160. The start pointer 140 is moved to the location of the first byte of the header 160. The end pointer 150 is moved to the location of the byte in the original data 120 that is the end of the first slice.

Figure 5:
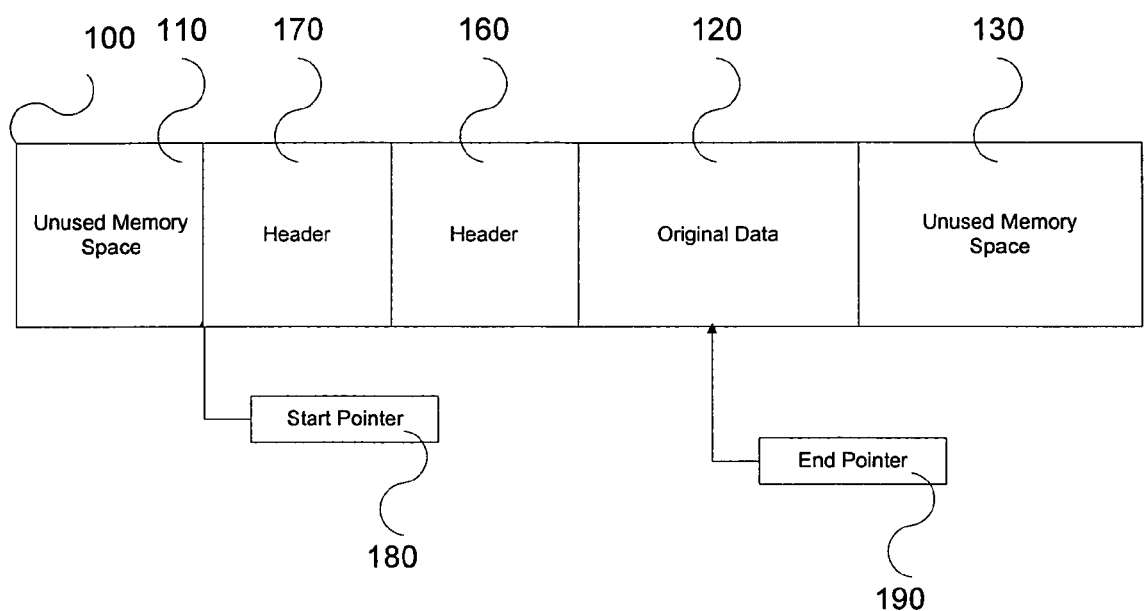
FIG. 5 depicts the contents of the common data buffer during the sending of data following the addition of header and checksum information by the second GPLC based protocol layer.

FIG. 5 depicts the state of the common data buffer 100 during the sending of data following the addition by the "send" method of the second protocol layer of the protocol layer's headers and checksums 170. The start pointer 180 is moved to the location of the first byte of header 170. The end pointer 190 remains at the location of the byte in the original data 120 that is the end of the first slice of data. It should be noted that each "send" method maintains its own local start pointer and end pointer that are initialized to the values of the invoking protocol layer's start pointer and end pointer when the "send" method is invoked by the higher level protocol layer. The reason for this is that the active start pointer and end pointer automatically are set to the proper position in the common data buffer upon the exit and return of a "send" method invoked by the "send" method of a higher level protocol layer therefore eliminating the need for each "send" method to recalculate the position of each pointer upon the exit and return of the invoked lower level protocol's "send" method.

Figure 6:
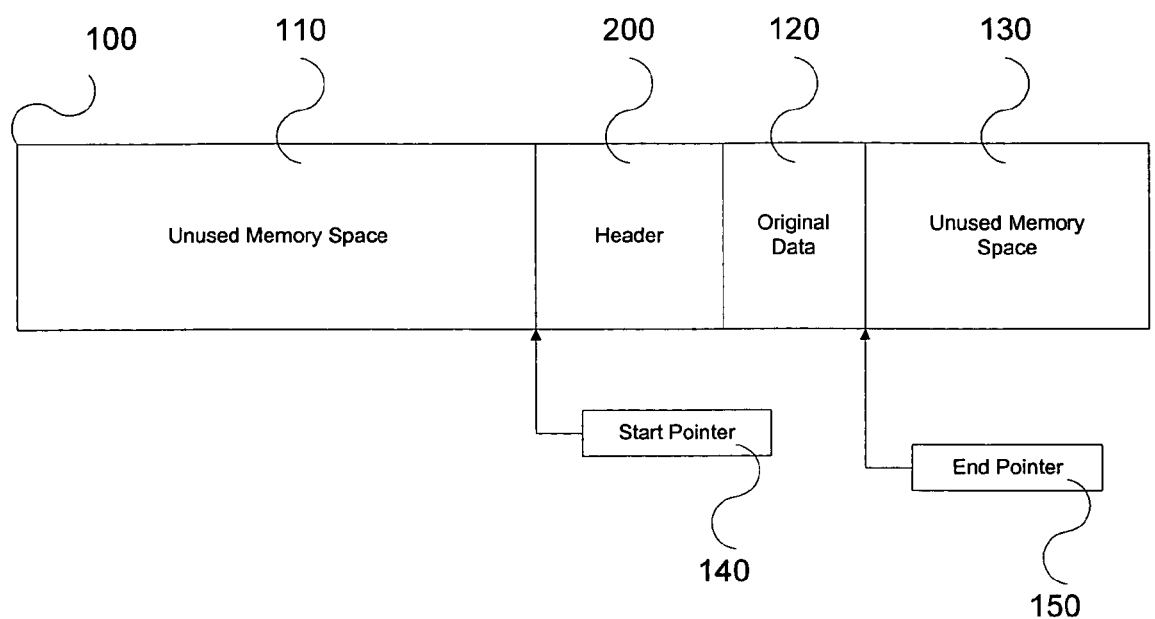
FIG. 6 depicts the contents of the common data buffer during the sending of data following the addition of header and checksum information to the second slice by the first GPLC based protocol layer.

FIG. 6 depicts the state of the common data buffer 100 during the sending of data following the extraction of the second slice by the "send" method of the first protocol layer and the addition by such "send" method of the protocol layer's headers and checksums 200. The start pointer 140 is moved to the location of the first byte of the header 200. The end pointer 150 is moved to the location of the byte in the original data 120 that is the end of the second slice.

Figure 7:
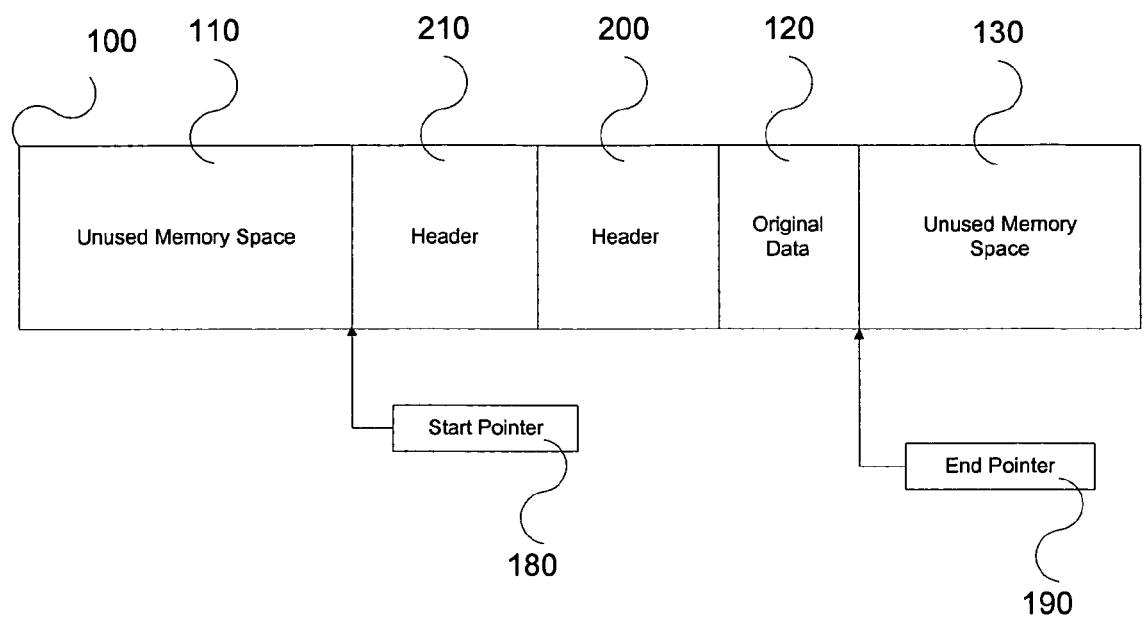
FIG. 7 depicts the contents of the common data buffer during the sending of data following the addition of header and checksum information by the second GPLC based protocol layer.

FIG. 7 depicts the state of the common data buffer 100 during the sending of data following the addition by the "send" method of the second protocol layer of such protocol layer's headers and checksums 210. The start pointer 180 is moved to the location of the first byte of the header 210. The end pointer 190 is moved to the location of the byte in the original data 120 that is the end of the first slice.

Figure 8:
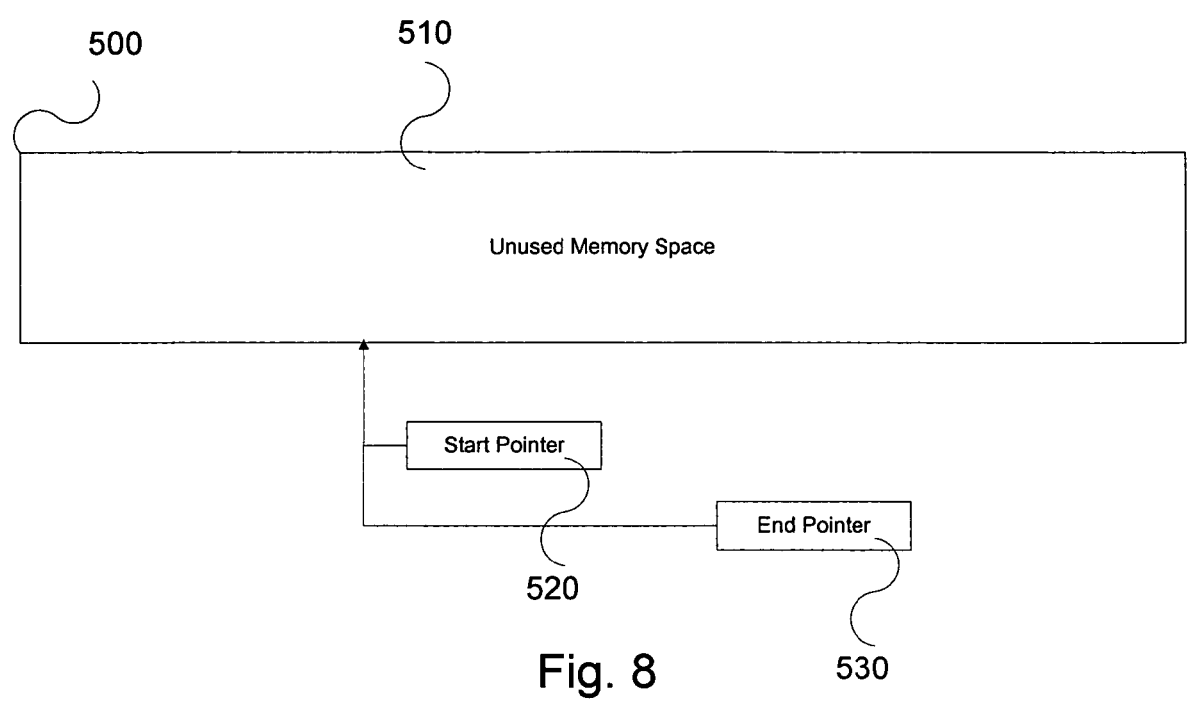
FIG. 8 depicts contents of the common data buffer upon the initiation of the receipt of data by the first GPLC based protocol layer.

FIG. 8 depicts the state of the common data buffer 500 during the receipt of data upon the initiation of the receipt processes by the "receive" method of the first protocol layer. The start pointer 520 and end pointer 530 are set to the same byte of unused memory space 510 located within the common data buffer 500.

Figure 9:
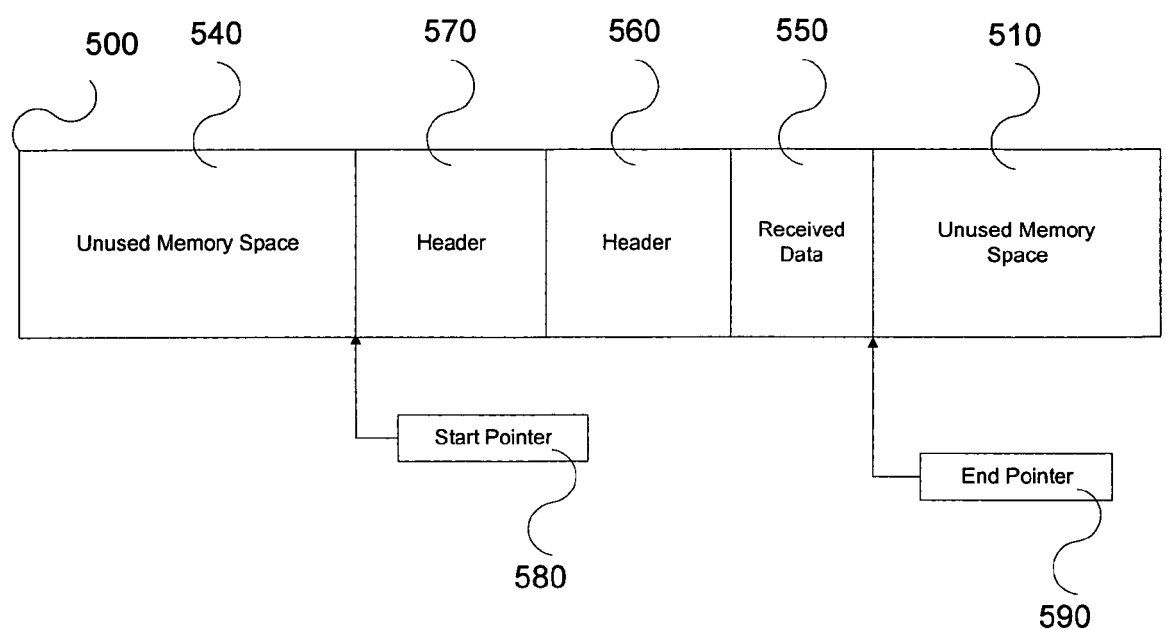
FIG. 9 depicts contents of the common data buffer during the receipt of data following the placement of the data into the common data buffer by the second GPLC based protocol layer.

FIG. 9 depicts the state of the common data buffer 500 during the receipt of data following the receipt by the second protocol layer of the received data 550 and attached headers 560 and 570 and placement of such data and headers into the common data buffer 500 by the "send" method of the second protocol layer operating on the remote machine. The start pointer 580 is set to the location of the first byte of header 570 (the last header to be added onto the received data during the send process). The end pointer 590 is set to the location of the last byte of the received data 550.

Figure 10:
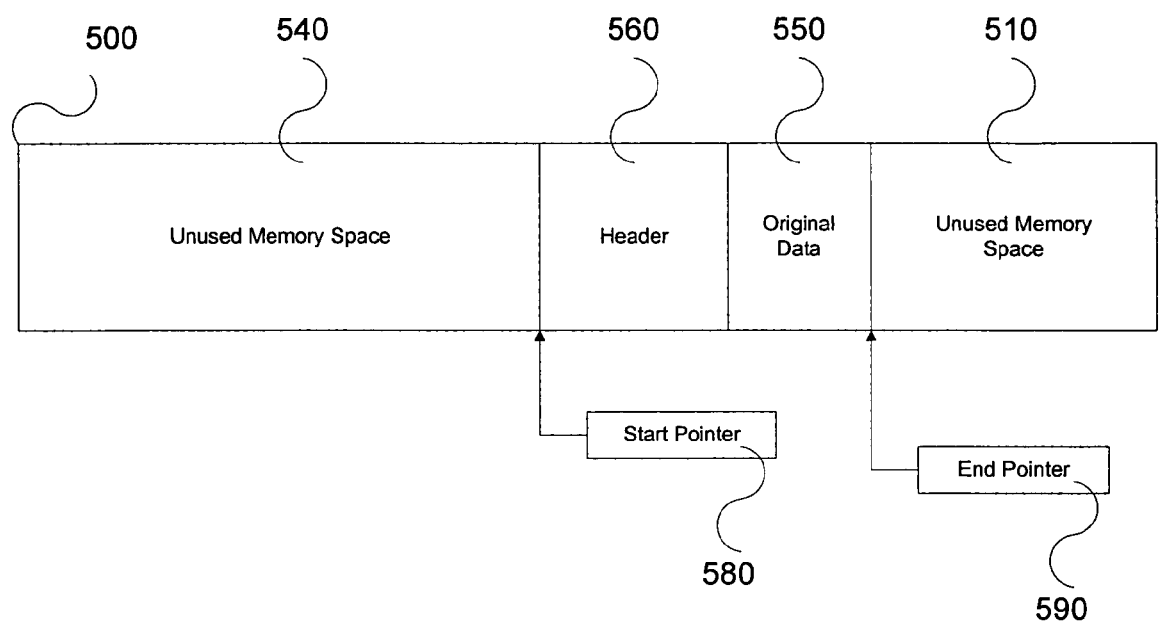
FIG. 10 depicts the contents of the common data buffer during the receipt of data following the stripping by the second GPLC based protocol layer of header and checksum information placed on such data by the equivalent protocol layer during sending.

FIG. 10 depicts the state of the common data buffer 500 during the receipt of data following the stripping of header 570 by the "receive" method of the second protocol layer. The start pointer 580 is moved to the location of the first byte of header 560 (the first header to be added onto the received data during the send process). The end pointer 590 remains set to the location of the last byte of the received data 550.

Figure 11:
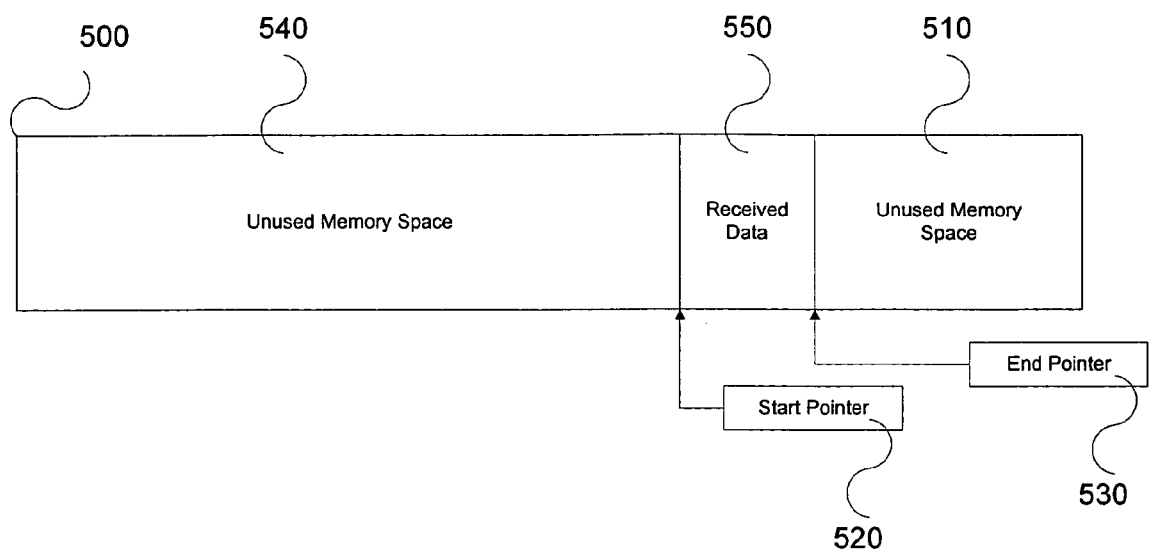
FIG. 11 depicts the contents of the common data buffer during the receipt of data following the stripping by the first GPLC based protocol layer of header and checksum information placed on such data by the equivalent protocol layer during sending.

FIG. 11 depicts the state of the common data buffer 500 during the receipt of data following the stripping of header 560 by the "receive" method of the first protocol layer. The start pointer 520 is moved to the location of the first byte of the received data 550. The end pointer 530 remains set to the location of the last byte of the received data 550. In the preferred implementation, when practical, any needed data reassembly (i.e. from multiple packets) is performed only at the highest application layer as this reduces the amount of copying and moving of data that is required.

The present invention can be realized in software or a combination of hardware and software. Any kind of computer system or other apparatus adapted for carrying out the methods described herein is suited. A typical combination of hardware and software could be a general purpose computer system with a computer program that, when loaded and executed, controls the computer system such that it carries out the methods described herein. The present invention can also be embedded in a computer program product, which comprises all the features enabling the implementation of the methods described herein, and which, when loaded in a computer system, is able to carry out these methods.

Computer program instructions or computer program in the present context mean any expression, in any language, code or notation, of a set of instructions intended to cause a system having an information processing capability to perform a particular function either directly or after either or both of the following occur: a) conversion to another language, code or notation; b) reproduction in a different material form.

Those skilled in the art will appreciate that many modifications to the preferred embodiment of the present invention are possible without departing from the spirit and scope of the present invention. In addition, it is possible to use some of the features of the present invention without the corresponding use of the other features. Accordingly, the foregoing description of the preferred embodiment is provided for the purpose of illustrating the principles of the present invention and not in limitation thereof, since the scope of the present invention is defined solely by the appended claims.

What is claimed is:

1. In a network having a sending computer system and a receiving computer system, each of the sending and receiving computer systems including a processor, a memory and a network adapter, the memory containing a data structure used for storing a common data buffer, a method for sending and receiving payload data by layers or sub-layers of at least one communications protocol, comprising the steps of:

(a) storing a first start pointer pointing to a first byte of the payload data in a first common data buffer of the sending computer system;

(b) adding a first header to the payload data in the first common data buffer at a location preceding the byte pointed to by the first start pointer according to a first protocol layer of the communications protocol at the sending computer system;

(c) adjusting the first start pointer to point to a first byte of the first header;

(d) invoking a send procedure of a second and lower protocol layer of the communications protocol at the sending computer system;

(e) transferring to the second protocol layer the start pointer by the send procedure, wherein the payload data is not copied in preparation for or during the send procedure;

(f) adding a second header to the payload data in the first common data buffer at a location preceding the first start pointer, wherein the second header is contiguous with the first header;

(g) sending the payload data and the first and second headers to the receiving computer system;

(h) storing the payload data and the first and second headers in a second common data buffer of the receiving computer system;

(i) invoking a receive procedure of a second protocol layer of the communications protocol at the receiving computer system;

(j) storing a second start pointer pointing to a first byte of the second header in the second common data buffer;

(k) adjusting the second start pointer to point to the first byte of the first header according to the second protocol layer at the receiving computer system;

(l) invoking a receive procedure of a first and higher protocol layer of the communications protocol at the receiving computer system; and (m) transferring to the first protocol layer at the receiving computer system the second start pointer, wherein the payload data is not copied in preparation for or during the receive procedure.

2. In a computer system including a processor, a memory and a network adapter, the memory containing a data structure used for storing a common data buffer, a method for sending payload data by layers or sub-layers of at least one communications protocol, the method comprising the steps of:

(a) storing a start pointer pointing to a first byte of the payload data in the common data buffer of the computer system;

(b) adding a first header to the payload data in the common data buffer at a location preceding the byte pointed to by the first start pointer according to a first protocol layer of the communications protocol;

(c) adjusting the start pointer to point to a first byte of the first header;

(d) invoking a send procedure of a second and lower protocol layer of the communications protocol at the sending computer system;

(e) transferring to the second protocol layer the start pointer by the send procedure, wherein the payload data is not copied in preparation for or during the send procedure; and (f) adding a second header to the payload data in the first common data buffer at a location preceding the first start pointer, wherein the second header is contiguous with the first header.

3. The method of claim 2 wherein a checksum is added to the header in the common data buffer preceding the payload data being sent.

4. The method of claim 2 wherein the transferring step includes any application data or information required by the send procedure of the second and lower protocol layer.

5. The method of claim 2 further comprising the step of (f) adjusting a size of the payload data to be sent by the second and lower protocol layer by adjusting the end pointer.

6. In a computer system including a processor, a memory and a network adapter, the memory containing a data structure used for storing a common data buffer, a method for receiving payload data by layers or sub-layers of at least one communications protocol, the method comprising the steps of:

(a) storing the payload data, a first header, and a second header in the common data buffer of the receiving computer system, wherein the second header is contiguous with the first header;

(b) invoking a receive procedure of a second protocol layer of the communications protocol;

(c) storing a start pointer and an end pointer to the payload data;

(d) storing a second start pointer pointing to a first byte of the second header in the common data buffer;

(e) adjusting the start pointer to point to the first byte of the first header according to the second protocol layer;

(f) invoking a receive procedure of a first and higher protocol layer of the communications protocol; and (g) transferring to the first protocol layer the start pointer, wherein the payload data is not copied in preparation for or during the receive procedure.

7. The method of claim 6 wherein a checksum following the header and added by the sending computer system is removed from the received payload data in the common data buffer.

8. The method of claim 7 wherein the checksum is removed by adjusting the start pointer of the common data buffer to point to a memory location following the checksum.

9. The method of claim 6 further comprising the step of (m) transferring any application data or information required by the receive procedure of the first and higher protocol layer.

10. A computer system for sending and receiving payload data by layers or sub-layers of at least one communications protocol, the computer system comprising:

a processor for processing data from an application program;

a sending component for sending the payload data,
  wherein the sending component stores a first start pointer pointing to a first byte of the payload data in a first common data buffer of the sending computer system;
  wherein the sending component adds a first header to the payload data in the first common data buffer at a location preceding the byte pointed to by the first start pointer according to a first protocol layer of the communications protocol at the sending computer system; wherein the sending component adjusts the first start pointer to point to a first byte of the first header;
  wherein the sending component invokes a send procedure of a second and lower protocol layer of the communications protocol at the sending computer system; and
  wherein the sending component transfers to the second protocol layer the start pointer by the send procedure, wherein the payload data is not copied in preparation for or during the send procedure;

wherein the sending component adds a second header to the payload data in the first common data buffer at a location preceding the first start pointer, wherein the second header is contiguous with the first header; and wherein the sending component sends the payload data and the first and second headers to the receiving computer system; and a receiving component for receiving the payload data, wherein the receiving component stores the payload data, the first header, and the second header in a second common data buffer of the receiving computer system;

wherein the receiving component invokes a receive procedure of a second protocol layer of the communications protocol at the receiving computer system;

wherein the receiving component adjusts the second start pointer to point to the first byte of the first header according to the second protocol layer at the receiving computer system;

wherein the receiving component invokes a receive procedure of a first and higher protocol layer of the communications protocol at the receiving computer system; and wherein the receiving component transfers to the first protocol layer at the receiving computer system the second start pointer, wherein the payload data is not copied in preparation for or during the receive procedure.

11. A computer system for sending payload data by layers or sub-layers of at least one communications protocol, the computer system comprising:

a processor for processing data from an application program;

a sending component for sending the payload data stored, wherein the sending component stores a start pointer pointing to a first byte of the payload data in a common data buffer of the computer system;

wherein the sending component adds a first header to the payload data in the common data buffer at a location preceding the byte pointed to by the start pointer according to a first protocol layer of the communications protocol;

wherein the sending component adjusts the start pointer to point to a first byte of the first header;

wherein the sending component invokes a send procedure of a second and lower protocol layer of the communications protocol;

wherein the sending component transfers to the second protocol layer the start pointer by the send procedure, wherein the payload data is not copied in preparation for or during the send procedure;

wherein the sending component adds a second header to the payload data in the common data buffer at a location preceding the start pointer, wherein the second header is contiguous with the first header; and wherein the sending component sends the payload data and the first and second headers to a receiving computer system.

12. The computer system of claim 11 wherein the sending component adds a checksum to the header in the common data buffer preceding the payload data being sent.

13. The computer system of claim 11 wherein the sending component transfers any application data or information required by the send procedure of the second and lower protocol layer.

14. The computer system of claim 11 wherein the sending component adjusts a size of data to be sent by the second and lower protocol layer by adjusting the end pointer.

15. A computer system for receiving payload data by layers or sub-layers of at least one communications protocol, the method comprising the steps of:

a processor for processing data from an application program;

a receiving component for receiving the payload data, wherein the receiving component stores the payload data, a first header, and a second header in a common data buffer of the computer system, wherein the second header is contiguous with the first header;

wherein the receiving component invokes a receive procedure of a second protocol layer of the communications protocol;

wherein the sending component stores a start pointer and an end pointer to the payload data;

wherein the receiving component stores a second start pointer pointing to a first byte of the second header in the common data buffer;

wherein the receiving component adjusts the start pointer to point to the first byte of the first header according to the second protocol layer;

wherein the receiving component invokes a receive procedure of a first and higher protocol layer of the communications protocol; and wherein the receiving component transfers to the first protocol layer the start pointer, wherein the payload data is not copied in preparation for or during the receive procedure.

16. The computer system of claim 15 wherein the receiving component removes a checksum added by the sending computer system from the received payload data in the common data buffer.

17. The computer system of claim 16 wherein the receiving component removes the checksum by adjusting the start pointer of the common data buffer to point to a memory location following the checksum.

18. The computer system of claim 15 wherein the receiving component transfers any application data or information required by the receive procedure of the first and higher protocol layer.

19. A computer readable medium containing a computer program for the sending and receiving payload data by layers or sub-layers of at least one communications protocol, the computer program comprising program instructions for:

storing a first start pointer pointing to a first byte of the payload data in a first common data buffer of the sending computer system;

adding a first header to the payload data in the first common data buffer at a location preceding the byte pointed to by the first start pointer according to a first protocol layer of the communications protocol at the sending computer system;

adjusting the first start pointer to point to a first byte of the first header; invoking a send procedure of a second and lower protocol layer of the communications protocol at the sending computer system;

transferring to the second protocol layer the start pointer by the send procedure, wherein the payload data is not copied in preparation for or during the send procedure;

adding a second header to the payload data in the first common data buffer at a location preceding the first start pointer, wherein the second header is contiguous with the first header;

sending the payload data and the first and second headers to the receiving computer system;

adjusting the second start pointer to point to the first byte of the first header according to the second protocol layer at the receiving computer system;

invoking a receive procedure of a first and higher protocol layer of the communications protocol at the receiving computer system; and transferring to the first protocol layer at the receiving computer system the second start pointer, wherein the payload data is not copied in preparation for or during the receive procedure.

20. A computer readable medium containing a computer program for sending payload data by layers or sub-layers of at least one communications protocol, the computer program comprising program instructions for:

storing a first start pointer pointing to a first byte of the payload data in a first common data buffer of the sending computer system;

adding a first header to the payload data in the first common data buffer at a location preceding the byte pointed to by the first start pointer according to a first protocol layer of the communications protocol at the sending computer system;

adjusting the first start pointer to point to a first byte of the first header;

invoking a send procedure of a second and lower protocol layer of the communications protocol at the sending computer system;

transferring to the second protocol layer the start pointer by the send procedure, wherein the payload data is not copied in preparation for or during the send procedure;

adding a second header to the payload data in the first common data buffer at a location preceding the first start pointer, wherein the second header is contiguous with the first header; and sending the payload data and the first and second headers to the receiving computer system.

21. The computer readable medium of claim 20 wherein the computer instructions add a checksum to the header in the common data buffer preceding the payload data being sent.

22. The computer readable medium of claim 20 wherein the computer instructions transfer any application data or information required by the send procedure of the second and lower protocol layer.

23. The computer readable program medium of claim 20 wherein the computer instructions adjust a size of the payload data to be sent by the second and lower protocol layer by adjusting the end pointer.

24. A computer readable medium containing a computer program for receiving payload data by layers or sub-layers of at least one communications protocol, the computer program comprising program instructions for:

storing the payload data, a first header, and a second header in the common data buffer of the receiving computer system, wherein the second header is contiguous with the first header;

invoking a receive procedure of a second protocol layer of the communications protocol;

storing a start pointer and an end pointer to the payload data;

storing a second start pointer pointing to a first byte of the second header in the common data buffer;

adjusting the start pointer to point to the first byte of the first header according to the second protocol layer;

invoking a receive procedure of a first and higher protocol layer of the communications protocol; and transferring to the first protocol layer the start pointer, wherein the payload data is not copied in preparation for or during the receive procedure.

25. The computer readable medium of claim 24 wherein the program instructions remove a checksum added by the sending computer system from the received payload data in the common data buffer.

26. The computer readable medium of claim 25 wherein the program instructions remove the checksum by adjusting the start pointer of the common data buffer to point to a memory location following the checksum.

27. The computer readable medium of claim 24 wherein the program instructions transfer any application data or information required by the receive procedure of the first and higher protocol layer.

28. A method for processing payload data in a computer system using layers of a network communications protocol, the method comprising the steps of:

(a) storing the payload data, a first header, and a second header in a data buffer, wherein the second header is contiguous with the first header;

(b) processing the payload data using a first protocol layer of the network communications protocol; and (c) processing the payload data using a second protocol layer of the network communications protocol, wherein the payload data is not copied during and between being processed by the first and second protocol layers.

29. The method of claim 28 wherein the payload data does not move within the data buffer during and between being processed by the first and second protocol layers.

30. The method of claim 28 wherein the processing step (a) further comprises the steps of:

(a2) positioning a first pointer to point to a first byte of the payload data; and (a3) positioning a second pointer to point to a last byte of the payload data, wherein the first protocol layer uses the first and second pointers to locate the payload data for processing.

31. The method of claim 30 wherein the processing step (b) further comprises the steps of:

(b2) adding a first element to the payload data; and (b3) moving the second pointer to point to a last byte of the first element, wherein the first pointer does not move when the first element is added.

32. The method of claim 31 wherein the processing step (c) further comprises the steps of:

(c2) adding a second element to the payload data; and (c3) moving the second pointer to point to a last byte of the second element, wherein the second protocol layer uses the first and second pointers to locate the payload data and the first element to add the second element, wherein the first pointer does not move when the second element is added.

33. The method of claim 32 wherein the first element comprises a header associated with the first protocol layer.

34. The method of claim 32 wherein the first element comprises a checksum associated with the first protocol layer.

35. The method of claim 32 wherein the second element comprises a header associated with the second protocol layer.

36. The method of claim 32 wherein the second element comprises a checksum associated with the second protocol layer.

37. A system for processing payload data using layers of a network communications protocol, the system comprising:

a processor for processing data from an application program; and a component that stores the payload data, a first header, and a second header in a data buffer, wherein the second header is contiguous with the first header, wherein the component further processes the payload data using a first protocol layer of the network communications protocol and a second protocol layer of the network communications protocol, and wherein the payload data is not copied during and between being processed by the first and second protocol layers.

38. A computer readable medium containing a computer program for processing payload data using layers of a network communications protocol, the computer program comprising program instructions for:

storing the payload data, a first header, and a second header in a data buffer, wherein the second header is contiguous with the first header;

processing the payload data using a first protocol layer of the network communications protocol; and processing the payload data using a second protocol layer of the network communications protocol, wherein the payload data is not copied during and between being processed by the first and second protocol layers.

39. The computer readable medium of claim 38 wherein the payload data does not move within the data buffer during and between being processed by the first and second protocol layers.

40. The computer readable medium of claim 38 wherein the program instructions for storing the payload data in a data buffer further comprise program instructions for:

positioning a first pointer to point to a first byte of the payload data; and positioning a second pointer to point to a last byte of the payload data, wherein the first protocol layer uses the first and second pointers to locate the payload data for processing.

41. The computer readable medium of claim 40 wherein the program instructions for processing the payload data using a first protocol layer further comprise program instructions for:

adding a first element to the payload data; and moving the second pointer to point to a last byte of the first element, wherein the first pointer does not move when the first element is added.

42. The computer readable medium of claim 41 wherein the program instructions for processing the payload data using a second protocol layer further comprise program instructions for:

adding a second element to the payload data; and moving the second pointer to point to a last byte of the second element, wherein the second protocol layer uses the first and second pointers to locate the payload data and the first element to add the second element, wherein the first pointer does not move when the second element is added.

43. The computer readable medium of claim 42 wherein the first element comprises a header associated with the first protocol layer.

44. The computer readable medium of claim 42 wherein the first element comprises a checksum associated with the first protocol layer.

45. The computer readable medium of claim 42 wherein the second element comprises a header associated with the second protocol layer.

46. The computer readable medium of claim 42 wherein the second element comprises a checksum associated with the second protocol layer.

* * * * *